United States Patent
Zawalski et al.

(10) Patent No.: US 9,946,831 B1
(45) Date of Patent: Apr. 17, 2018

(54) METHOD FOR CLOSED LOOP TESTING OF ASICS WITH IMAGE SENSORS IN EMULATION

(71) Applicant: Cadence Design Systems, Inc., San Jose, CA (US)

(72) Inventors: Gavin Walter Zawalski, San Jose, CA (US); Wenyong Huang, Shanghai (CN)

(73) Assignee: Cadence Design Systems, Inc., San Jose, CA (US)

( * ) Notice: Subject to any disclaimer, the term of this patent is extended or adjusted under 35 U.S.C. 154(b) by 243 days.

(21) Appl. No.: 14/793,671

(22) Filed: Jul. 7, 2015

(51) Int. Cl.
*G06F 17/50* (2006.01)

(52) U.S. Cl.
CPC .................. *G06F 17/5081* (2013.01)

(58) Field of Classification Search
CPC .................................... G06F 17/5081
USPC ........................................ 716/134
See application file for complete search history.

(56) References Cited

U.S. PATENT DOCUMENTS

| 8,249,845 | B1* | 8/2012 | Britch ................. G06F 17/5027 703/13 |
| 8,453,086 | B2 | 5/2013 | Tung et al. |
| 8,572,529 | B2 | 10/2013 | Zawalski et al. |
| 8,739,109 | B2* | 5/2014 | Shimizu .............. G06F 17/5063 716/101 |
| 8,743,735 | B1 | 6/2014 | Bershteyn et al. |
| 8,745,300 | B2 | 6/2014 | Kuo |
| 2005/0044299 | A1 | 2/2005 | Lin et al. |
| 2006/0195299 | A1* | 8/2006 | Kuehn .................. H04L 67/025 702/188 |
| 2015/0242295 | A1* | 8/2015 | Nguyen .............. G06F 17/5027 703/28 |
| 2016/0154917 | A1* | 6/2016 | Melmoth ............ G06F 17/5027 703/25 |

OTHER PUBLICATIONS

Mentor Graphics, "iSolve Multimedia-Exerciser", Hardware-Based Functional Verification Datasheet, www.mentor.com/emulation; accessed: Mar. 23, 2015, 2 pages.
Cadence, "Cadence SpeedBridge Adapters", In-Circuit emulation of designs under real-world operating conditions, http://www.cadence.com/products/sd/speedbridge/adapters/pages/default.aspx, accessed: Mar. 23, 2015, 2 pages.

(Continued)

*Primary Examiner* — Jack Chiang
*Assistant Examiner* — Brandon Bowers
(74) *Attorney, Agent, or Firm* — Andrews Kurth Kenyon LLP (57) ABSTRACT

A system, method, and computer program product for dynamic closed loop testing of an emulated ASIC interfaced to a sensor device. An adapter adjusts non-pre-recorded active sensor device data to be readable by an emulated ASIC design by adjusting data rates and performing formatting per a selected compatible interface. The adapter also adjusts control commands generated by the emulated ASIC design, including those generated in response to received and evaluated sensor device data, to be readable by the sensor device. The control commands dynamically cause changes in the data the sensor device subsequently outputs. Exemplary sensor devices include cameras that generate multimedia data in consumer electronics devices.

17 Claims, 4 Drawing Sheets

(56) References Cited

OTHER PUBLICATIONS

Cadence, "Cadence Speedbridge Adapter for USB Devices", High-speed in-circuit emulation for hardware/software co-verification, http://www.cadence.com/rl/Resources/datasheets/speedbridge_adapter_usb_devices_ds.pdf, accessed: Mar. 23, 2015, 2 pages.
Cadence, "Cadence Speedbridge System For Video and Audio In-Circuit Emulation Solution", Datasheets, http://www.cadence.com/rl/Resources/datasheets/speedbridge_system_video_audio_ds.pdf, accessed: Mar. 23, 2015, 2 pages.
Cadence, "Accelerated Verification IP", http://www.cadence.com/products/sd/pages/accvip.aspx, accessed: Mar. 23, 2015, 2 pages.
Cadence, "Accelerating RTL Sign-Off", EDACafe, Cadence Expands Portfolio of System-Level Verification IP and SpeedBridge Adapters to Boost Acceleration and Emulation Performance, http://www10.edacafe.com/nbc/articles/1/612508/Cadence-Expands-Portfolio-System, accessed: Mar. 23, 2015, 3 pages.
Cadence, "Cadence Palladium XP", Verification Computing Platform, Technical Brief, http://www.cadence.com/products/sd/palladium_xp_series/pages/default.aspx, accessed: Mar. 23, 2015; pp. 1-14.
Cadence, "Cadence Palladium XP Series", http://www.cadence.com/products/sd/palladium_xp_series/Pages/default.aspx, accessed: Mar. 23, 2015, 3 pages.
Cadence, "Protium Rapid Prototyping Platform", FPGA-based prototyping solution, http://www.cadence.com/rl/Resources/datasheets/protium_rapid_protyping_ds, accessed: Mar. 23, 2015, 3 pages.
Cadence, "SoC Verification Using Cadence Verification IP", An in-depth examination of SoC verification/validation approaches including Accelerated VIP, accessed: Mar. 23, 2015, http://www.cadence.com, pp. 1-9.
Cadence, "Cadence Palladium XP II Verification Computing Platform", http://www.cadence.com/rl/Resources/technical_briefs/palladium_xp_II_tb.pdf., accessed: Mar. 23, 2015, pp. 1-4.
Cadence, "The Facts: Why Accelerated VIP is Needed for SoC Verification", http://community.cadence.com/cadence/blogs_8/b/fv/archive/2012/05/15/the-facts, accessed: Mar. 23, 2015, 3 pages.
Lattice Semiconductor, "MIPI CSI2-to-CMOS Parallel Sensor Bridge", www.latticesemi.com, accessed Mar. 23, 2015, pp. 1-15.
MIPI Alliance, "MIPI Alliance (/)", Camera Interface Specification, http://mipi.org/specification/camera-interface, accessed: Mar. 24, 2015, pp. 1-5.

* cited by examiner

METHOD FOR CLOSED LOOP TESTING OF ASICS WITH IMAGE SENSORS IN EMULATION

FIELD OF THE INVENTION

This description relates to the field of integrated circuit design and testing, including circuit simulation and emulation, and more precisely to closed loop verification of application-specific integrated circuits (ASICs) with image sensors in emulation.

BACKGROUND

As integrated circuit designs continue to increase in size and complexity, the verification of their correct operation becomes increasingly time-consuming. Rapid verification is particularly important for circuit designs for portable consumer electronics devices. Smartphones, notebook and tablet computers, and digital cameras for example all require proper integration of software and hardware for reliable operation. Consumer devices commonly feature various high speed data interfaces and attached peripheral components such as image sensors, for capturing images and video and then generating properly formatted multimedia data for users.

There are many different sensor devices currently available from various manufacturers, and each sensor device may have unique features and options to be managed by the ASIC to which it interconnects. Designers may therefore need to verify that their ASICs work properly with particular sensor devices before their designs are actually manufactured. That is, test results may be obtained and compared to expected behavior. Unfortunately, simulation times with conventional software-based circuit simulation tools have become excessive for many very large circuit designs.

Further, accurate models for particular sensor devices may be unavailable and/or may improperly represent some aspects of sensor device operation. Some dynamic aspects of sensor device operation are also simply very difficult to model adequately. For example, most sensor device models do not accurately describe the changes to image data that may result from changes to the input parameters for controlling image contrast, focus, and image brightness under various conditions.

Designers are therefore increasingly moving from the use of a testbench-based sensor device model to the use of a real fabricated sensor device when verifying the interoperation of the sensor device and the ASIC design to which it interconnects. This design path is complicated by the fact that many actual low-cost sensor devices are designed to generate multimedia data continuously and only at their normally high output speeds, versus generating only a limited amount of test data at sufficiently low output speeds for an ASIC simulation system.

Design tool vendors are therefore pursuing different approaches to resolve the ASIC verification speed issue for their customers. These approaches may include operating a version of the ASIC design via improved software-based circuit design simulation, hardware-assisted circuit design simulation acceleration, and fully hardware-based circuit design emulation. For generality, in this description the term "emulator" refers to a system using any combination of these different verification approaches.

Emulators may enable testing speeds that are hundreds to thousands of times greater than with conventional software-based simulation. An emulated ASIC may issue commands to a connected real sensor device and receive multimedia data in response, just as when a testbench-based model of the sensor device is used. However, generated sensor device data is often provided continuously by a real sensor device, which makes simple buffering difficult.

The mismatch between the sensor device data rates and the maximum data rates that emulated ASICs can handle has recently been addressed through the use of adapters in emulators. An adapter is generally a hardware device that connects an emulated device under test (e.g., an ASIC) to an external stimulus generator (e.g., a sensor device). In one conventional example, the adapter may send a pre-generated sensor data stream into the emulated ASIC at a speed the emulator can manage, to provide particular image sequences for ASIC verification. The pre-generated sensor data stream may be a merely re-played recording of data from a manufactured sensor device, or may be produced by a testbench-based sensor device modeled in a circuit simulation tool being run by a number of processors for example. However, such pre-generated sensor data of course does not change even if the ASIC generates parameterized control commands for transmission to the sensor device.

Such simple re-playing of pre-recorded or programmed static data streams for testing ASIC designs lacks flexibility and does not take full advantage of the availability of active sensor data generated by a sensor device that is responsive to ASIC commands. A need thus exists for more fully dynamic interoperation between emulated ASIC designs and interfaced sensor devices. Accordingly, the inventors have developed a novel way to help circuit designers and design tool vendors more reliably design and dynamically test the operation of ASICs to be used with high speed sensor devices.

DETAILED DESCRIPTION

This description presents a system, method, and computer program product for closed loop testing of emulated ASICs for use with image sensors and other sensor devices. Circuit designs surviving the testing process may then be translated into manufacturable descriptions of circuits, ultimately for physical fabrication of those circuits. The embodiments described thus advance the circuit design art by enabling a greater level of verification of ASIC designs prior to such fabrication.

A new type of adapter may better span the gap between high speed sensor devices and lower speed emulated circuit designs and thus provide increased verification flexibility. Briefly, the adapter may perform a bidirectional speed adjustment to facilitate a dynamic closed loop connection between the sensor device and the emulated ASIC. Data from the sensor device, for example video data comprising a sequence of image frames from a camera, typically arrives at a data rate that needs to be reduced for the emulator. Low speed control commands from the ASIC may also need to be bridged so that the emulated ASIC may for example properly read and write registers in a higher speed sensor device.

Figure 1:
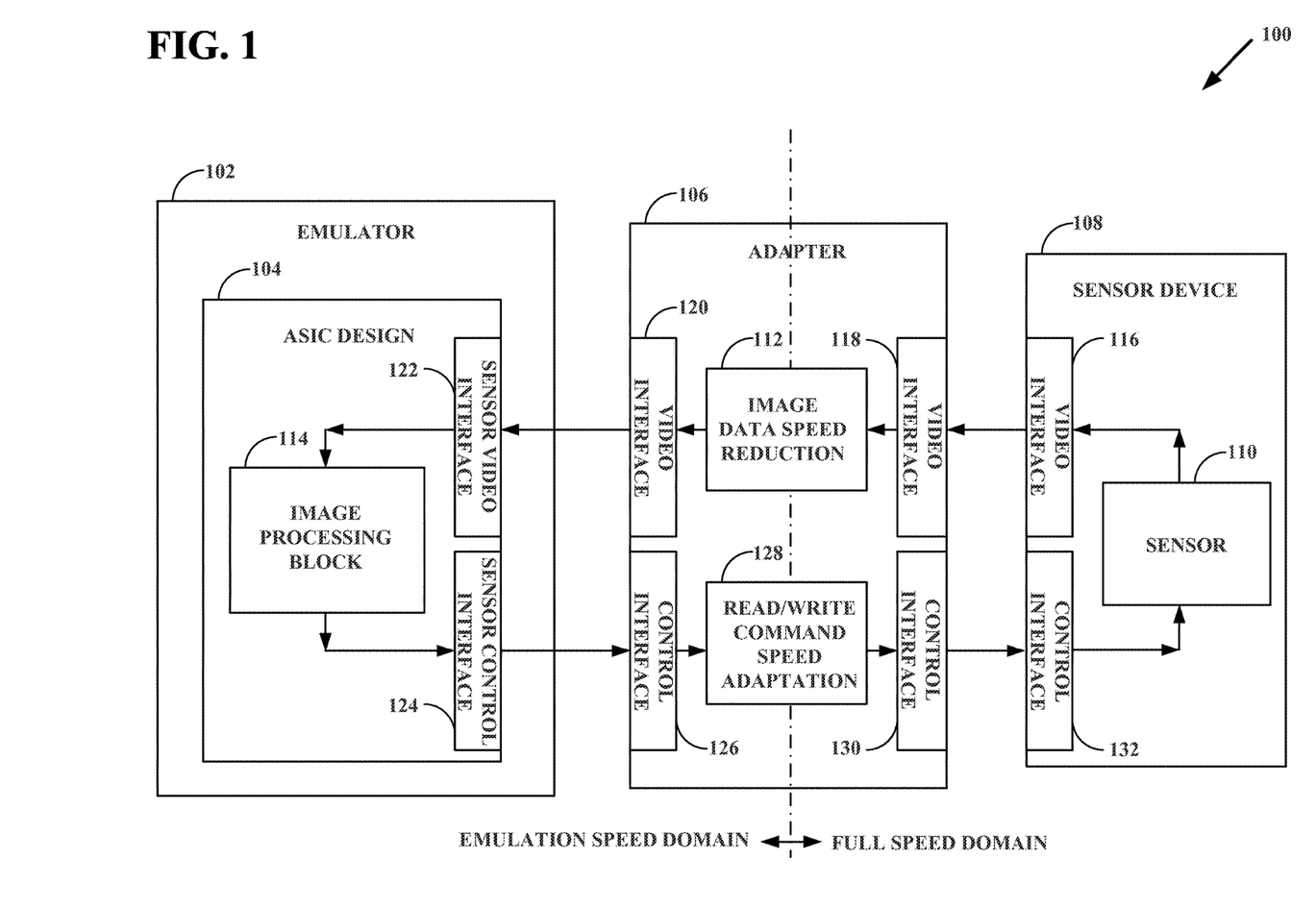
FIG. 1 is a diagram of an adapter system 100, according to an embodiment.

FIG. 1 shows a diagram of an adapter system 100, according to an embodiment. This exemplary and non-limiting system may comprise an emulator 102, an emulated ASIC design 104, an adapter 106, and a sensor device 108. The emulator 102 may comprise a system that implements the ASIC design 104 without an actual manufactured ASIC, and may comprise a software-based simulation tool, a hardware-assisted simulation accelerator, a hardware-based emulator, or any combination thereof. The sensor device 108 may comprise any device, such as a video sensor generating a video data stream comprising video frames, capable of generating data to be processed by the emulated ASIC design 104 or by a manufactured ASIC design in a finished product.

An ASIC design to be emulated may for example be described by a Register Transfer Level (RTL) description or a gate-level netlist. The gate-level netlist may be synthesized from an RTL source, including a hardware description language (HDL) such as Verilog or VHDL. Both RTL and gate-level netlists are descriptions of the circuit design's components and the electrical interconnections between the components.

Massive parallelism may enable a hardware-based emulator to operate at speeds that may be orders of magnitude greater than a conventional software-based simulation tool. A circuit design may be compiled for implementation into such a hardware-based emulator, including a commercially available field programmable gate array (FPGA) based emulator for example.

Hardware-assisted simulation accelerators may also model the ASIC design 104 in hardware, but in some embodiments they may still employ testbenches in a simulation tool, as with a software-based simulation tool. Thus, a testbench in a software-based simulation tool may generate test stimuli that are processed by the hardware-modeled ASIC design 104, which may in turn communicate with the sensor device 108 via the adapter 106. Sensor device 108 may be an actual manufactured hardware component such as a camera. The adapter 106 may therefore provide a speed conversion between a simulation acceleration and a real sensor device 108, just as it may provide a speed conversion between a hardware-based emulator and a real sensor device 108.

The adapter 106 may enable interoperation of the sensor device 108 with the emulated ASIC design 104 even though the sensor device 108 and the emulated ASIC design 104 typically operate at different speeds. That is, the adapter 106 may enable a fast sensor device 108 to be interfaced to an emulated circuit design running at emulation speed, to ensure the circuit design's correct "in-system" behavior. Adapters may support various industry standard interfaces.

The adapter 106 may perform a speed conversion for both the sensor data from the sensor device 108 and the control commands from the emulated ASIC design 104. The sensor device 108 may not be able to output its data at a variable rate, or may output its data at a rate that is typically higher than may be processed by the emulated ASIC design 104. Thus the sensor device 108 may be said to operate in a "full speed domain", while the emulated ASIC design 104 may be said to operate in an "emulation speed domain". Each adapter 106 may thus be considered as a functionally transparent rate adjuster that connects real-world systems or accelerated simulated systems with the circuit design being emulated.

In one embodiment, the sensor device 108 may comprise a camera assembly capable of generating multimedia data that may comprise audio data, image data, and/or video data. A sensor unit 110 may comprise the particular hardware, such as a charge-coupled device (CCD) for example, that gathers light for incorporation into multimedia data. Portable consumer electronics devices are widely known to include such sensor devices. A microphone may gather sound.

The sensor device 108 may also comprise a video interface 116 and a control interface 132. The video interface 116 may output multimedia data, typically in an industry standard format. One such format is the Mobile Industry Processor Interface (MIPI) Camera Serial Interface (CSI), which defines an interface between a peripheral device (e.g., a camera), and a host processor. The majority of image sensors in the consumer market currently use the MIPI CSI-2 interface, which was first specified in 2005.

While the discussion herein provides specific examples of sensor devices 108, as well as interface standards, with which the adapter 106 may operate, the invention is not so limited. Other types of sensor devices and interface standards are within the contemplation of the invention.

The control interface 132 may receive input commands that direct the operation of the sensor device 108. Such commands may specify for example the desired image resolution, frame rate, contrast settings, and other descriptive parameters used in the generation of the multimedia data. The commands may also for example instruct the sensor device 108 to continuously generate or "read out" multimedia data. The commands received by the control interface 132 may be those issued by the ASIC design 104 or they may be modified or replacement commands issued by the adapter 106.

The emulated ASIC design 104 may also comprise a sensor video interface 122 and a sensor control interface 124. The sensor video interface 122 may be designed to receive multimedia data in a given format. In a fabricated ASIC design 104, the sensor video interface 122 may connect directly to the video interface 116 of the sensor device 108. In the emulated ASIC design 104, however, the sensor video interface 122 may instead receive filtered multimedia data from the adapter 106, because the emulation speed may be significantly lower than the multimedia data generation speed.

Similarly, in the fabricated ASIC design 104, the sensor control interface 124 may connect directly to the control interface 132 of the sensor device 108 to issue commands in a given format. In the emulated ASIC design 104, however, the sensor control interface 122 may instead send commands to the adapter 106, which may again manage the difference between emulation speed and the actual operating speed of the sensor device 108. The adapter 106 may in some instances replace a command issued by the emulated ASIC design 104 to ensure proper overall operation. For example, a single original read command may be replaced with a repeating read command to ensure ongoing sensor data generation by the sensor device 108.

The emulated ASIC design 104 may also comprise an image processing block 114 that may perform various operations on the received multimedia data inputs, such as format and resolution conversions, and decompression/compression for example. The operations may be performed according to a predetermined test program or in response to dynamic aspects of the particular received multimedia data. The image processing block 114 may thus issue a variety of commands that are intended to analyze received multimedia data and determine if some sensor parameters need adjustment.

Thus, unlike previous adapter systems, embodiments of the adapter system 100 described enable dynamic closed loop testing of the emulated ASIC design 104. Embodiments may not only use actively generated or "live" non-prerecorded multimedia data coming from a manufactured or simulated sensor device 108, but may also actively and responsively generate commands from the emulated ASIC design 104 that control the sensor device 108. These generated commands may thus actively cause changes in subsequently generated multimedia data.

Embodiments of the adapter 106 may thus enable closed loop testing of the ASIC design 104 in emulation with the sensor device 108 by adjusting the speed differences between the faster domain in which the sensor device 108 operates and the emulation speed domain in which the emulated ASIC design 104 operates. A control interface 126 may receive commands from the sensor control interface 124 of the emulated ASIC design 104. These received commands may be generated at emulation speed, which is typically lower than the speed at which the sensor device 108 operates and properly receives commands. The adapter 106 may therefore include hardware 128 to perform read/write command speed adaptation across the two different speed domains. That is, the adapter 106 may receive commands at a low emulation speed and "upconvert" them to "full" speed.

Hardware 128 may in one embodiment comprise a buffer that stores incoming write commands and related parameters received by the control interface 126. The hardware 128 may then regenerate the stored write commands and related parameters to the control interface 130 at appropriate times and according to established interface formats. For processing read commands, the hardware 128 may first capture the address of a read command at emulation speed, and then regenerate the read command to the control interface 130 for transmission to the sensor device 108 at full speed. The control interface 130 may thus transfer commands to the control interface 132 of the sensor device 108 at the full speed and in the interface format that the sensor device 108 is designed to receive. The adapter 106 may therefore be functionally transparent for transferring commands and related parameters across an emulation-compatible interface.

The adapter 106 may also receive incoming multimedia data from the video interface 116 of the sensor device 108 at a video interface 118, for example in response to a read command. The incoming multimedia data may be generated by the sensor device 108 at full speed, which again is typically greater than the emulation speed at which the emulated ASIC design 104 operates. The adapter 106 may therefore include hardware 112 to perform multimedia data speed reduction across the two different speed domains. That is, the adapter 106 may receive sensor data at a high speed and "downconvert" it to a speed that is compatible with the emulated ASIC design 104. Direct measurement of the actual emulation speed may be performed.

In one embodiment, hardware 112 may "drop" or periodically discard a selected number or percentage of incoming video image frames. Proper selection of the sensor data dropping rate may ensure that the non-discarded filtered exemplary video image frames may be passed on to a video interface 120 at an acceptable rate for the emulated ASIC design 104. That is, the data filtration process may be adjusted according to the actual emulation speed. Emulation speed may not vary significantly for a given hardware-based emulator design compilation, but may vary somewhat for software-based simulation and for hardware-assisted simulation acceleration. The adapter 106 may therefore be functionally transparent for transferring selected multimedia data across an emulation-compatible interface.

Figure 2:
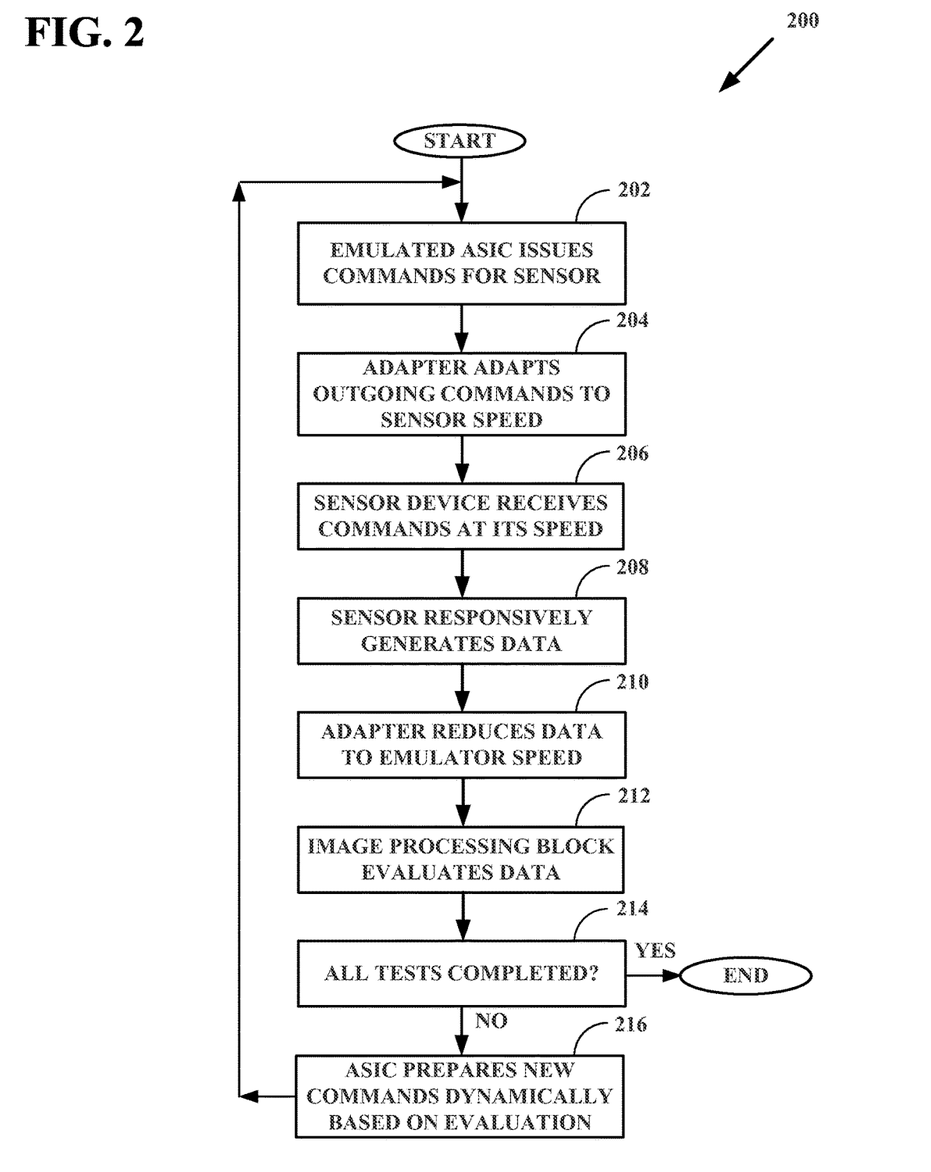
FIG. 2 is a flowchart 200 of an adapter operation methodology, according to an embodiment.

FIG. 2 shows a flowchart 200 of an adapter operating methodology, according to an embodiment. The different aspects of the overall methodology are now described in more detail in terms of particular exemplary and non-limiting operations in this figure. A first major aspect of the overall methodology is to transfer commands from the emulated ASIC 104 to the sensor device 108. At 202, the emulated ASIC 104 may issue commands for the sensor device 108 at a particular emulation speed. At 204, the adapter 106 may adjust the outgoing commands to a particular speed at which the sensor device 108 operates, which is typically higher than the emulation speed. At 206, the sensor device 108 may receive the outgoing commands, originated by the emulated ASIC 104 and in some instances translated into new replacement commands by the adapter, at the full speed for which the sensor device 108 is designed to operate.

A second major aspect of the overall methodology is to transfer multimedia data from the sensor device 108 to the emulated ASIC 104. At 208, the sensor device 108 may generate multimedia data in response to commands and parameters from the emulated ASIC 104. At 210, the adapter 106 may adapt the incoming multimedia data to a particular emulation speed at which the emulated ASIC 104 operates, which is typically lower than the speed at which the sensor device 108 operates. In one embodiment, the adapter 106 may selectively filter or discard incoming image frames to perform this speed adaptation. At 212, the image processing block 114 may receive the filtered multimedia data at emulation speed, and may evaluate the multimedia data. At 214, the adapter operating methodology may determine if all desired tests of the emulated ASIC design 104 have been completed, in which case the methodology may tangibly output test results and corresponding ASIC verification results determined therefrom, and end. Otherwise, at 216, the emulated ASIC design 104 may prepare new commands for transmission to the sensor device 108. The new commands may be based on the evaluation of the multimedia data, and thus close the feedback loop between the emulated ASIC design 104 and the sensor device 108 in spite of their different respective operating speeds.

The described exemplary and non-limiting adapter system and methodology may advance the art of circuit design and manufacturing in several ways. First, users may test ASIC sensor device interfaces with real sensor devices, with their unmanufactured ASIC design modeled in an emulator. Next, users may perform general sensor/ASIC testing as well as hardware/software integration of specific sensor devices. Finally, users may complete closed loop testing of ASIC image processing algorithms using non-pre-generated or "live" active sensor data, whether from a manufactured sensor device or a sensor device being simulated at an accelerated speed relative to the ASIC emulation speed.

Further, circuit designers may integrate specific sensor devices with their ASIC in emulation without relying on lower fidelity sensor device models. Users of the embodiments may thus discover and address any unique features or limitations of the particular sensor device that may be undocumented or poorly documented prior to physical ASIC fabrication. Designers may also develop software and firmware on the emulated circuit design that configures or controls any sensor device; for example, users may verify general image processing and sensor device adjustment algorithms in the ASIC to evaluate compatibility with particular sensor devices and/or models. In terms of design project management, ASIC integration with sensor devices may be pulled upstream into the emulation phase of a design project, versus the later hardware prototyping or post-fabrication debugging phases.

Figure 3:
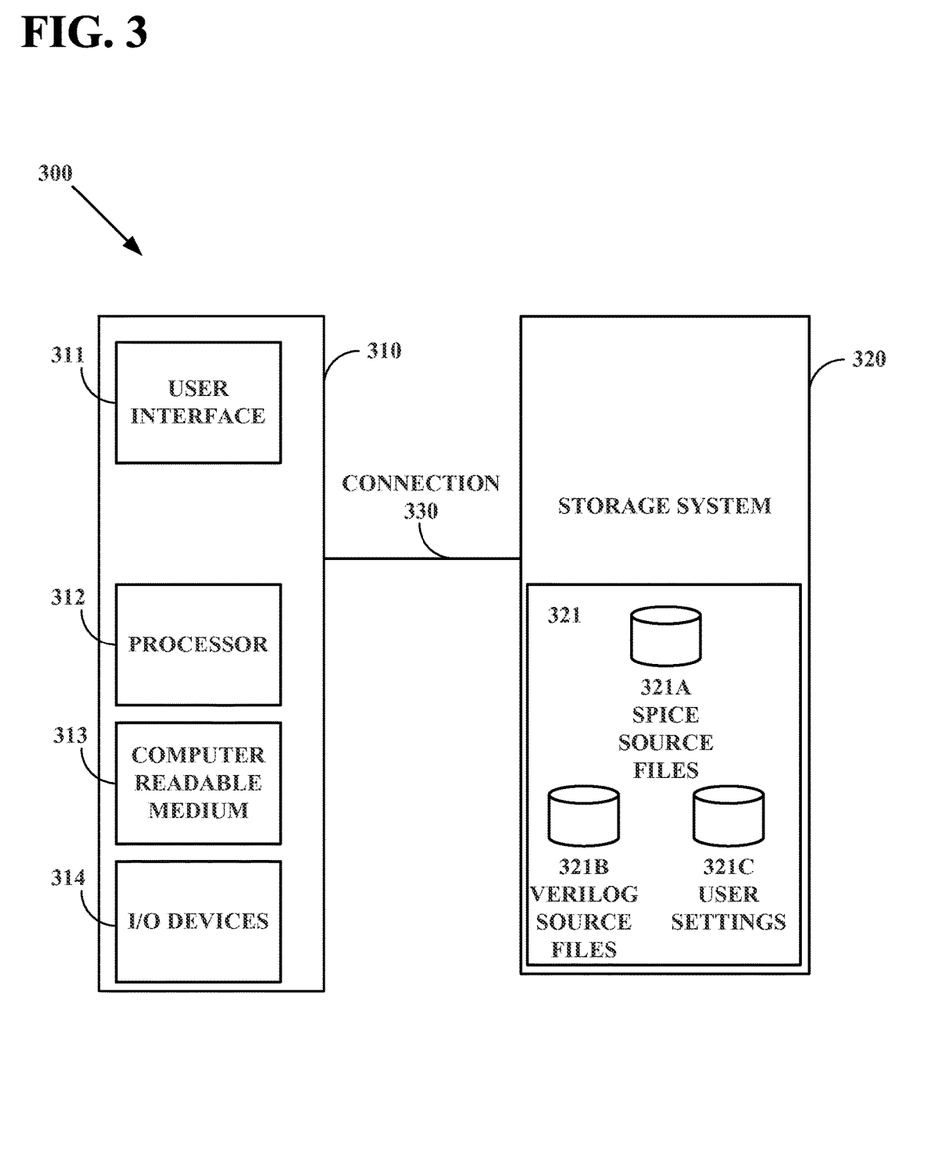
FIG. 3 is a block diagram of a circuit analysis system 300, according to an embodiment.

FIG. 3 shows a block diagram of an exemplary circuit analysis system 300, according to an embodiment. This system may provide simulator functionality for any of the methods described above. A user may access the system 300 through a standalone client system, client-server environment, or a network environment. System 300 may comprise one or more clients or servers 310, one or more storage systems 320, and a connection or connections 330 between and among these elements.

Client 310 may execute instructions stored on transitory or non-transitory computer readable medium 313 with processor 312, and may provide a user interface 311 to allow a user to access storage system 320. The instructions may be part of a software program or executable file that may operate electronic design automation (EDA) software. Client 310 may be any computing system, such as a personal computer, workstation, mobile computer, or other device employing a processor which is able to execute programming instructions. User interface 311 may be a graphical user interface (GUI) run in a user-controlled application window on a display. A user may interact with user interface 311 through one or more input/output (I/O) devices 314 such as a keyboard, a mouse, or a touch screen.

Storage system 320 may take any number of forms, including but not limited to a server with one or more storage devices attached to it, a storage area network, or one or a plurality of non-transitory computer readable media. Databases 321 may be stored in storage system 320 such that they may be persistent, retrieved, or edited by the user. Databases 321 may include SPICE source files 321A, Verilog source files 321B, and a user input database 321C for example. These databases may be kept as separate files or systems, or may be merged together in any appropriate combination.

Only one client 310 is shown connected to storage system 320 through connection 330, which may be a simple direct wired or wireless connection, a system bus, a network connection, or the like, to provide client 310 with access to storage system 320. In another aspect, connection 330 may enable multiple clients 310 to connect to storage system 320. The connection may be part of a local area network, a wide area network, or another type of network, again providing one or more clients with access to storage system 320. Depending on system administrator settings, client 310's access to system storage 320 or to other clients may be limited.

Figure 4:
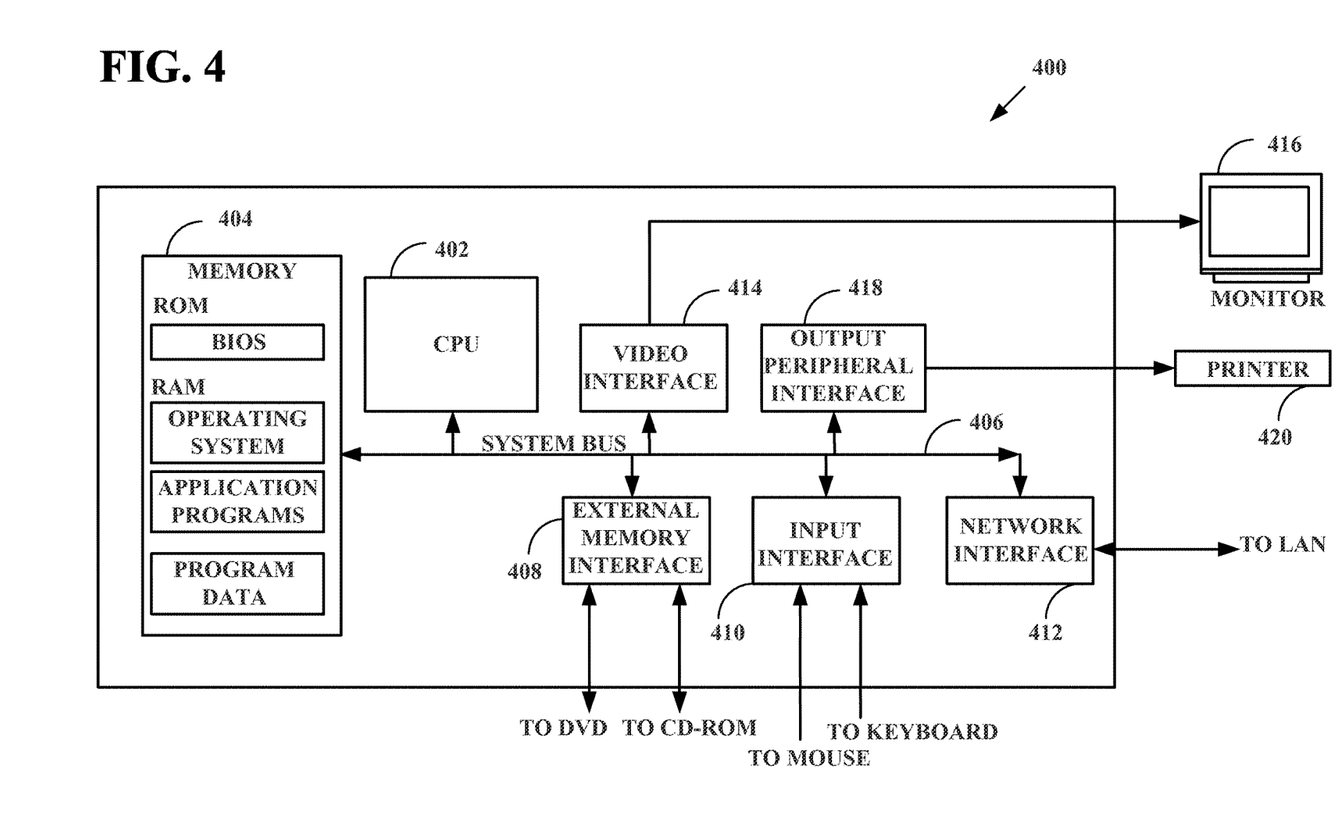
FIG. 4 is a diagram of a computer system 400, according to an embodiment.

FIG. 4 depicts an exemplary computer system comprising the structure for implementation of embodiments described above. Computer system 400 comprises a central processing unit (CPU) 402 that processes data stored in memory 404 exchanged via system bus 406. Memory 404 typically includes read-only memory, such as a built-in operating system, and random-access memory, which may include an operating system, application programs, and program data. Computer system 400 also comprises an external memory interface 408 to exchange data with a DVD or CD-ROM for example. Further, input interface 410 may serve to receive input from user input devices including but not limited to a keyboard and a mouse. Network interface 412 may allow external data exchange with a local area network (LAN) or other network, including the internet. Computer system 400 also typically comprises a video interface 414 for displaying information to a user via a monitor 416. An output peripheral interface 418 may output computational results and other information to output devices including but not limited to a printer 420.

Computer system 400 may comprise for example a personal computer or an engineering workstation, each of which is widely known in the art and is commonly used for integrated circuit design tasks, along with software products commercially available for performing computer-aided integrated circuit design tasks. Computer system 400 may also comprise a mobile computer, including for example a tablet computer or a smart phone. The computer system of FIG. 4 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" means one or more than one. The term "plurality" means two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of embodiments may serve as the code segments directing a computing device to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention are possible. The invention is limited only by the scope of the appended claims.

What is claimed is:

1. A system for determining whether a design for a circuit meets design specifications, so as to facilitate the provision of a manufacturable description of the circuit, the system comprising:
    a sensor device for generating active sensor data, wherein the sensor device comprises a manufactured sensor device;
    an emulator for operating the design using at least some of the active sensor data as input and for issuing a command, in response to emulated design performance results, that alters subsequently generated active sensor data; and
    an adapter for connecting the sensor device and the emulator across an emulation-compatible interface,
    wherein the emulator tangibly outputs a verification determination from a comparison of the emulated design performance results and the design specifications in order to provide the manufacturable description of the circuit.

2. The system of claim 1 wherein the sensor device includes a MIPI CSI-2 standard interface.

3. The system of claim 1 wherein the active sensor data comprises multimedia data comprising at least one of audio data, image data, and video data.

4. The system of claim 1 wherein the emulator comprises at least one of a software-based circuit simulation tool, a hardware-assisted simulation accelerator, and a hardware-based emulator.

5. The system of claim 1 wherein the emulator operates at a rate that is not greater than a sensor data generation rate.

6. The system of claim 1 wherein the adapter filters the active sensor data to output selected active sensor data to the emulator at a rate not exceeding an emulator operating rate.

7. The system of claim 1 wherein the adapter buffers at least one issued command for transmission to the sensor device within a sensor device command reception rate.

8. The system of claim 1 wherein the adapter translates at least one issued command into at least one new command that causes the sensor device to output further generated sensor data that is transferred to the emulator within an emulator operating rate.

9. The system of claim 8 wherein the issued command is a read command and the new command comprises a repeating read command.

10. A hardware-implemented method for determining whether a design for a circuit meets design specifications, so as to facilitate the provision of a manufacturable description of the circuit, the method comprising:
    generating active sensor data with a sensor device, wherein the sensor device comprises a manufactured sensor device;
    operating the design with an emulator using at least some of the active sensor data as input;
    issuing at least one command for the sensor device with the emulator in response to emulated design performance results;
    connecting the sensor device and the emulator across an emulation-compatible interface with an adapter;
    comparing the emulated design performance results and the design specifications to form a verification determination; and
    tangibly outputting the verification determination in order to provide the manufacturable description of the circuit.

11. The method of claim 10 wherein the sensor device includes a MIPI CSI-2 standard interface.

12. The method of claim 10 wherein the active sensor data comprises multimedia data comprising at least one of audio data, image data, and video data.

13. The method of claim 10 wherein the emulator comprises at least one of a software-based circuit simulation tool, a hardware-assisted simulation accelerator, and a hardware-based emulator.

14. The method of claim 10 wherein the adapter filters the active sensor data to output selected active sensor data to the emulator at a rate not exceeding an emulator operating rate.

15. The method of claim 10 herein the adapter buffers at least one issued command for transmission to the sensor device within a sensor device command reception rate.

16. The method of claim 10 wherein the adapter translates at least one issued command into at least one new command that causes the sensor device to output further generated sensor data that is transferred to the emulator within an emulator operating rate.

17. The method of claim 16 wherein the issued command is a read command and the new command comprises a repeating read command.

* * * * *